United States Patent [19]
Daugherty

[11] Patent Number: 5,899,304
[45] Date of Patent: May 4, 1999

[54] MOTOR BRAKE

[76] Inventor: Jack L. Daugherty, 204 Wren Rd., DeRidder, La. 70634

[21] Appl. No.: 08/861,158

[22] Filed: May 21, 1997

[51] Int. Cl.$^6$ .............................. B60T 13/04; F16D 49/16
[52] U.S. Cl. .............................. 188/171; 188/75; 188/216
[58] Field of Search .................................... 188/171, 173, 188/74, 75, 76, 216, 163, 165, 161, 158, 156, 196 M, 196 V, 79.57

[56] References Cited

U.S. PATENT DOCUMENTS

| | | | |
|---|---|---|---|
| 960,055 | 5/1910 | Sundh | 188/171 |
| 1,860,394 | 5/1932 | Ohler | 188/171 |
| 1,902,640 | 3/1933 | Halfvarson | 188/171 |
| 3,348,639 | 10/1967 | Ames et al. | |
| 4,020,926 | 5/1977 | Slatter et al. | |
| 4,116,308 | 9/1978 | Sever | |
| 4,196,797 | 4/1980 | Taylor | |
| 4,787,484 | 11/1988 | Webb | |
| 4,875,558 | 10/1989 | Berkhan et al. | |
| 5,092,432 | 3/1992 | Taig | 188/171 |
| 5,337,878 | 8/1994 | Mehlert et al. | |

FOREIGN PATENT DOCUMENTS 521825  5/1940  United Kingdom .

OTHER PUBLICATIONS

General Electric Co., "CR–9510 Automatic Brakes and CR–9500 Solenoids".
Victor R. Browning & Co., Inc., "Browning Electric Overhead Traveling Cranes".

*Primary Examiner*—Douglas C. Butler
*Attorney, Agent, or Firm*—Richard C. Litman

[57] ABSTRACT

The present invention is a fail safe motor brake for use with relatively large industrial motors, and particularly electric hoist motors as used with large overhead industrial cranes. The present brake includes an actuation linkage which results in relatively little change in the initial height or "air gap" of the solenoid plunger or armature, as the brake linings wear. The limited change in the air gap is due to a mechanical stop which is built into the adjustment and actuation linkage, as well as the clamping pressure provided by the spring arrangement which serves to actuate the brakes. The solenoid of the present brake is offset from the plane of the brake shoes, thus allowing removal and replacement of one or both shoes without need to remove the solenoid. This allows the brake shoes to be removed without need to readjust the actuation linkage. The present motor brake provides excellent performance throughout the life of the brake linings, without need to adjust the actuation linkage during this period. The present motor brake may also include other features which provide for long life and ease of maintenance, such as sealed bearings, additional lubrication points, and an attached air gap gauge and brake drum locking pin, to prevent "block drop," or falling of the hoist block due to the motor being allowed to turn, when the brake is released for service.

20 Claims, 4 Drawing Sheets

MOTOR BRAKE

BACKGROUND OF THE INVENTION

1. Field of the Invention

The present invention relates generally to fail safe braking devices for rotating wheels, shafts, and the like, and more specifically to a brake adapted for use with large electric motors as used in overhead cranes and the like. The present brake is automatic, in that if power is lost to the brake, the brake is automatically applied to stop rotation of the motor to prevent "block drop," i.e., to prevent a hoist block and/or any articles suspended therefrom, from falling if the motor is left to turn freely.

2. Description of the Related Art

Overhead cranes, i.e., cranes operating from a lateral beam or the like which is suspended from parallel tracks at both ends, are commonly used in heavy industry for moving heavy or bulky components from one point to another in a factory or plant. Such cranes typically have a large electric motor movably positioned along the lateral beam, thus providing two horizontal degrees of freedom of motion for a hoist block suspended from the motor. The hoist block typically suspended from such motors is generally quite large and heavy, in order to provide the required mechanical advantage for lifting heavy objects.

While the hoist motors themselves are almost universally geared to provide greater torque and to reduce output speeds to a reasonable level for lifting and lowering massive objects, it is nevertheless sometimes possible for the motor to be driven by a massive object suspended from the hoist block of the motor, when no power is being delivered to the motor for whatever reason. This is called "block drop," when the hoist block (and any object suspended from the block) falls essentially freely from the overhead motor.

This is an extremely hazardous situation, and accordingly, various automated motor braking devices have been developed to stop the motor in the event that electrical power is lost to the motor. These brakes generally include heavy springs which urge the brake shoes to an actuated position against a drum which rotates with the motor or transmission output shaft, with an electric solenoid having electrical power applied thereto to cause the springs to be retracted. The solenoid is generally wired in the same circuit as the motor, so when power is lost to the motor, the solenoid also loses power, thereby allowing the springs to clamp the brake shoes against the brake drum to prevent the motor from turning freely.

While the above principle works reasonably well, it is essential that the brake mechanism receive frequent inspections and service to ensure that it will work well when needed. The present invention includes various improvements over devices of the related art, to reduce the service and maintenance normally required of such devices. A discussion of related art known to the inventor, and its differences from the present invention, is provided below.

U.S. Pat. No. 3,348,639 issued on Oct. 24, 1967 to Victor H. Ames et al. describes an Industrial Brake having an automatic adjuster to take up slack as the brake shoes wear. The need for adjustment of slack in such systems is well known, as excessive travel of the solenoid plunger within the solenoid, due to excessive wear of the brake shoes without adjustment, can cause the solenoid coils or windings to burn out. Such solenoids are extremely costly to replace, and Ames et al. have developed a threaded, rotary adjuster to maintain a minimum amount of slack or travel in the system. The present invention differs in that no automatic adjustment is provided or required, as the linkage does not allow sufficient slack to develop as to endanger the solenoid windings. Also, the solenoid of the present automatic brake is offset from the lateral axis of the brake shoes, enabling the brake shoes to be removed and replaced without need to remove the solenoid and thus affect the adjustment.

U.S. Pat. No. 4,020,926 issued on May 3, 1977 to John R. Slatter et al. describes a Brake Apparatus Including Pressed Or Stamped Components. The primary object of the device is to provide an economically manufactured brake, and as such, the device lacks many features of the present brake. Slatter et al. require adjustment for their brake linkage, use a hinged solenoid arm rather than an axially moving plunger, and place their solenoid in line with the lateral axis of the brake shoes, thus requiring removal of the solenoid and adjustment of the linkage when at least the adjacent brake shoe is removed and/or replaced.

U.S. Pat. No. 4,116,308 issued on Sep. 26, 1978 to Janez F. Sever describes an Electromagnetically Operated Friction Brake having a laterally offset solenoid aligned with the brake shoe lateral axis, unlike the present invention. Sever utilizes an excessively large solenoid having little mechanical advantage, but still requires periodic adjustment to compensate for wear in the brake shoes or linings. While Sever provides a manual lever to spread the brake shoes in the event that no power is provided to actuate the solenoid, the present motor brake is easily manipulated to release the brakes without power to the solenoid, merely by applying pressure on the solenoid plunger in the manner in which the solenoid is normally electrically actuated.

U.S. Pat. No. 4,196,797 issued on Apr. 8, 1980 to David B. Taylor describes a Braking Apparatus And Control which selectively limits the rotational motion of the brake assembly about a drum or shaft which it is braking. The brake actuator operates oppositely to that of the present invention, in that the actuator extends to release the brake, rather than retracting, as in the present invention. Also, the actuator is a hydraulic strut, rather than an electric solenoid, as used in the present invention. The Taylor brake is considerably more complex than the present invention, in that it uses electronics to control the flow of hydraulic fluid to various components. Also, the brake actuator appears to be aligned with the lateral axis of the brake shoes, with the removal and/or replacement of the shoes requiring major disassembly of the device, unlike the present invention.

U.S. Pat. No. 4,787,484 issued on Nov. 29, 1988 to David J. Webb describes an Electromagnetically Operated Friction Brake Having Automatic Adjustment Mechanism. The basic mechanism is quite similar to that of the Sever '308 patent discussed further above, in that a relatively large, horizontally acting solenoid is used to operate the brake shoes. The solenoid is apparently aligned laterally with the brake shoes, unlike the configuration of the present invention. Webb discloses an automatic adjuster using a one way clutch operating on a threaded rod, while the present invention is free of any need for such automatic adjustment means U.S. Pat. No. 4,875,558 issued on Oct. 24, 1989 to Dietmar Berkhan et al. describes a Safety Brake For Escalators, wherein the brake comprises a disc with a grooved circumference with mating shoes or pads fitting tightly within the disc groove when the brake is actuated. The brake is actuated when electrical current to a solenoid is terminated, allowing the solenoid to extend and the brakes to be actuated by spring pressure, somewhat similarly to the operation of the present brake. However, the Berkhan et al.

brake solenoid is aligned with the plane of the disc and lateral axis of the brake shoes, unlike the present brake configuration. Also, the present brake incorporates different locking means for maintenance than the spring loaded pawl arrangement of the Berkhan et al. brake.

U.S. Pat. No. 5,337,878 issued on Aug. 16, 1994 to Martin Mehlert et al. describes an Assembly And Method For Adjusting Brake Force for Passenger Conveyor Emergency Brake. The specific type of brake is unclear, as a brake disc (rather than drum) is shown and described, but brake shoes operating against the edge of the disc are also shown and described. The device incorporates a controller to adjust the rate of brake application, depending upon the load on the system. This is beyond the scope of the present invention, which applies the brakes consistently whenever electrical power is removed from the solenoid. The Mehlert et al. solenoid is aligned with the plane of the disc and the lateral axes of the brake actuating arms, unlike the arrangement of the present invention.

British Patent Publication No. 521,825 accepted on May 31, 1940 to Ernest R. Elliston describes Improvements In Or Relating To Electro-mechanical Brakes. The system uses a pneumatic damping cylinder with the brake actuation spring therein and weight on the outer portion thereof, so that when electrical current to the solenoid is terminated, the spring is restricted from rapid movement due to the pneumatic action of the cylinder. Brake application is thus a gradual procedure. The present invention does not incorporate any such means of restricting initial brake application, and moreover the present brake includes various other features not disclosed by the Elliston British patent, such as the laterally offset solenoid, lack of any requirement for adjustment, and other features.

A publication by the General Electric Company (no date given) describes the CR-9510 Automatic Solenoid Brakes manufactured by that company. The various brakes shown each have the solenoid positioned in line with the lateral axis of the brake shoes, along the diametric center of the shoes, unlike the laterally offset solenoid of the present invention.

Finally, a publication by the Victor R. Browning & Co., Inc. (no date given) describes various features of their AC-63 to AC-135 and SW motor brakes. The publication essentially describes various adjustment features of the Browning brakes, none of which are used in the present invention. It is also noted that, as with all of the other brakes of which the present inventor is aware, the solenoids of the Browning Brakes are aligned with the lateral axis of the brake shoes in each case, whereas the present brake solenoid is laterally offset to provide for ease of removal and replacement of the brake shoes.

None of the above inventions and patents, either singly or in combination, is seen to describe the instant invention as claimed.

SUMMARY OF THE INVENTION

The present invention comprises a fail safe motor brake for use generally with large industrial motors. The present brake may be adapted to various types of motors (pneumatic, hydraulic, etc.) but is particularly suited for use with large electric hoist motors used in traveling cranes. The present brake includes various features which serve to respond to problems found in the prior art.

Accordingly, it is a principal object of the invention to provide an improved motor brake including an actuation linkage such that wear of the brake linings results in relatively little change in the solenoid air gap, thus obviating any need for adjustment of the linkage during the life of the brake linings.

It is another object of the invention to provide an improved motor brake which solenoid is offset from the lateral plane of the brake shoes, thereby providing ease of access to the brake shoes for service and maintenance without need to remove the solenoid or readjust the brake actuation linkage.

It is a further object of the invention to provide an improved motor brake including an actuation counter, to record the number of times the brake is actuated.

An additional object of the invention is to provide an improved motor brake including an attached solenoid air gap gauge, a brake locking pin to preclude motor and drum rotation during maintenance of the present brake, and other features.

Still another object of the invention is to provide an improved motor brake including a mechanical stop in the actuation linkage to preclude excessive linkage travel.

It is an object of the invention to provide improved elements and arrangements thereof in an apparatus for the purposes described which is inexpensive, dependable and fully effective in accomplishing its intended purposes.

These and other objects of the present invention will become apparent upon review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention comprises various embodiments of a motor brake for use with large industrial motors having brake drums to accommodate such brakes. While the present brake embodiments may be used with any suitable type of industrial motor, they are particularly well suited for use with brake drums of large industrial electric motors of the type disclosed in the Victor Browning & Co., Inc. reference noted above, and incorporated herein by reference.

Figure 1:
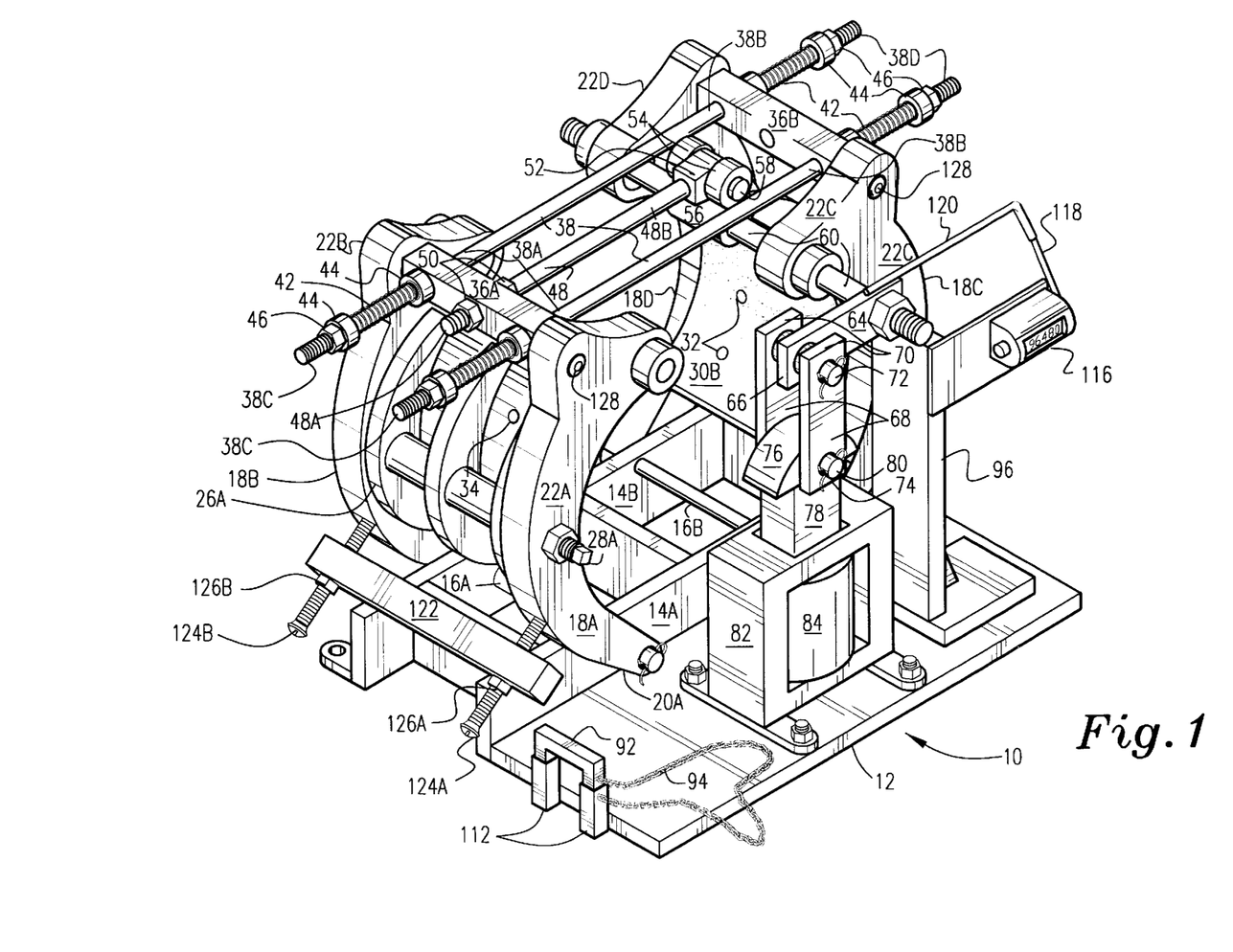
FIG. 1 is a perspective view of a first embodiment of the present motor brake invention, showing its various features.
Figure 3:
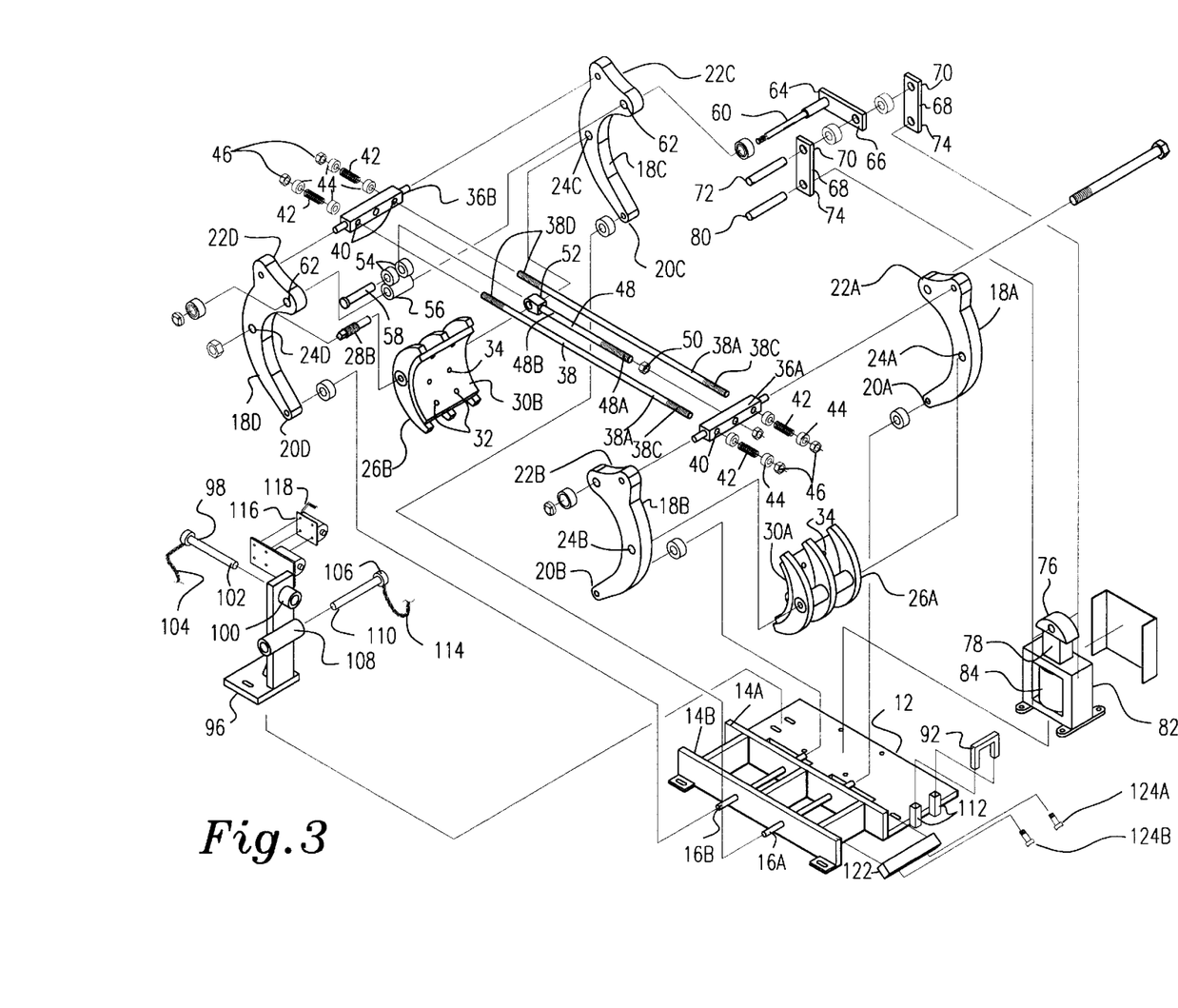
FIG. 3 is an exploded perspective view of the motor brake embodiment of FIG. 1, showing further details thereof.

FIGS. 1 and 3 respectively disclose a perspective assembly view and an exploded perspective view of a first embodiment of the present motor brake, designated by the reference numeral 10 in FIG. 1. The brake 10 is mounted upon a base 12, which in turn is secured to a frame or other structure with the motor (not shown, for clarity in the drawings) so as to position the brake shoes (described further below) to both sides of the motor brake drum, in the conventional manner. The base 12 includes a spaced apart pair of generally vertical flanges comprising a first flange 14a and a second flange 14b, which support a pair of brake arm pivot pins comprising a first pin 16a and a parallel second pin 16b which pass through the flanges 14a and 14b.

Four brake arms, comprising a pair of first brake arms 18a and 18b and an opposite pair of second brake arms 18c and 18d, are secured to the pins 16a and 16b, with the first pair of brake arms 18a/18b being pivotally secured to the first pin 16a and the second pair of brake arms 18c/18d being pivotally secured to the second pin 16b. Each of the arms has a lower end, respectively 20a, 20b, 20c, and 20d, with an attachment passage therethrough for securing the arms to the two pins 16a and 16b. The arms 18a through 18d each also have an upper end, respectively 22a through 22d, with a passage therethrough for an attachment for actuating and adjusting the brakes, as will be discussed further below. Finally, a central brake shoe mounting passage, respectively 24a through 24d, is provided through each of the brake arms 18a through 18d for mounting brake shoes thereto, as discussed further below.

Each pair of brake actuation arms 18a/18b and 18c/18d includes a brake shoe, respectively a first shoe 26a and a second shoe 26b, pivotally mounted therebetween, by a brake shoe mounting pin or bolt, e.g., bolts 28a (FIG. 1) and 28d (FIG. 3). Each of the shoes 26a and 26b includes a brake lining, respectively lining 30a and 30b, secured thereto, e.g., by rivets 32. (Other attachment means, such as bonding, may be used, but riveting is preferred as only the lining need be replaced using rivets, rather than having to replace the bonded lining and shoe assembly.) Preferably, the linings 30a and 30b are relatively thick, on the order of one half inch each, to provide long life and durability. The brake shoes 26a/26b and their respective linings 30a/30b are also preferably vented, e.g., by concentric passages 34 therethrough, for better heat dissipation when frictionally engaging the brake drum to bring the drum and motor to a stop.

The upper end pairs 22a/22b and 22c/22d of the respective brake actuating arm pairs 18a/18b and 18c/18d each include a guide block, respectively 36a and 36b, pivotally secured therebetween. These guide blocks 36a and 36b serve as attachment points for a pair of parallel, spaced apart tension rods 38. Each of the rods 38 has a first end 38a and an opposite second end 38b, which ends 38a and 38b pass through tension rod passages 40 formed through the respective guide blocks 36a and 36b and thus serve to tie the upper end pairs 22a/22b and 22c/22d of the two brake arm pairs 18a/18b and 18c/18d, together.

Each of the two tension rods 38 includes a first and an opposite second threaded distal end, respectively 38c and 38d, which extend outwardly past the two guide blocks 36. These ends 38c and 38d each accept a compression spring 42, with the springs 42 being adjustably secured between bushings or cups 44 by threaded nuts 46. The compression springs 42 serve to urge the upper ends of the brake arm pairs 18a/18b and 18c/18d together, thus clamping the two brake shoes 26a and 26b with their respective linings 30a and 30b against a motor brake drum disposed between the two shoes 26a/26b and their linings 30a/30b, to stop rotation of the drum. Preferably, the four springs 42 are formed of stainless steel, as are other moving parts of the present brake, in order to preclude or reduce corrosion which might otherwise bind components together. The springs preferably each have a compressive force on the order of seventy pounds per inch, which in their "series—parallel" arrangement results in a brake shoe closure force of seventy pounds for each inch of compression applied to the springs 42 by the nuts 46.

It will be seen that while the above described arrangement provides selectively adjustable clamping force to grip a brake drum between the two brake shoes 26a and 26b with their respective linings 30a and 30b, the tension rods 38 with their springs 44 do nothing to adjust the spacing between the brake linings 30a and 30b and the brake drum, or to release the brake by spreading the two brake shoes 26a and 26b apart.

Accordingly, a brake adjustment and release pushrod 48 is disposed between the two tension rods 38 and generally centered above the two brake shoes 26a and 26b, for adjusting the brake shoe and lining clearance from the drum when the brake is released and for selectively releasing the brake as desired. The pushrod 48 will be seen to be generally centered along the operational axis of the two brake shoes 26a and 26b, and thus defines a brake shoe actuation plane which passes vertically from the pushrod 48 downwardly through the two brake shoes 26a and 26b and diametrically through a brake drum disposed therebetween. The pushrod 48 includes a first threaded end 48a and an opposite second end 48b, with the first end 48a being adjustably affixed within the first guide block 36a by a pair of nuts 50 sandwiching the guide block 36a therebetween.

The opposite second end 48b of the pushrod 48 includes a rode end bearing 52 extending therefrom, which is pivotally attached to a coupling, comprising a pair of spaced apart offset bushings 54 which are welded or otherwise permanently and immovably affixed to a collar 56. The rod end bearing 52 is placed between the two bushings 54 and a pushrod pin 58 inserted therethrough, to capture the rod end bearing 52 pivotally between the two bushings 54. The collar 56 is in turn immovably secured to a brake release pin 60, e.g., by conventional set screws, Woodruff key and slot, etc. (not shown). The release pin 60 rotates through passages 62 in the upper ends 22c and 22d of the second brake arm pair 18c and 18d, to operate the offset release pushrod 40 from the coupling.

The brake release pin 60 extends outwardly from the two brake arm upper ends 22c and 22d, and includes a radial arm 64 extending therefrom. The arm 64 causes the brake release pin 60 to rotate within the brake arm upper end passages 62, thereby pivoting the brake release pushrod 48 toward the opposite brake shoe upper ends 22a and 22b, to drive the upper end pairs 22a/22b and 22c/22d apart, spreading the brake shoes 26a and 26b, thus releasing the linings 30a/30b from their contact with the brake drum therebetween to allow the drum and motor to which it is attached, to turn.

In the brake 10 embodiment illustrated in FIGS. 1 and 3, the radial arm 64 has a length sufficient to position the distal end 66 thereof essentially in alignment with the center of the brake 10, and thus also essentially centered vertically along the rotational axis of the motor and drum. A pair of spaced apart links 68 (micarta or other electrically insulating material) each have an upper end 70 pivotally secured to each side of the distal end 66 of the radial arm 64 by an upper link pin 72, with the two links 68 each having an opposite lower end 74 pivotally connected to the upper end 76 of a solenoid plunger 78 by a lower link pin 80, to sandwich the upper end 76 of the solenoid plunger 78 therebetween.

The present brake 10 is released by a solenoid 82, having a coil 84 through which the solenoid plunger 78 moves vertically. The solenoid 82 is positioned in a vertical plane along the rotational axis of the motor and brake drum, about which the present motor brake 10 is installed, to remain well clear of the brake shoe actuation plane and thus clear of the brake shoes.

The present brake 10 is a fail safe device, with the brake automatically being applied to the motor brake drum when no electrical power is applied to the solenoid 82. In other words, electrical power is required to cause the solenoid coil 84 to draw the plunger 78 downwardly into the coil 84 core by electromagnetic attraction. The present brake 10 is preferably electrically connected to the same electrical circuit as the industrial motor with which the brake 10 is assembled, so that when electrical power is applied to the motor, it is also applied to the solenoid coil 84. When this occurs, the solenoid plunger 78 is drawn electromagnetically downwardly into the coil 84, which rotates the radial brake release arm 64 by means of the interconnecting links 68 between the plunger 78 and arm distal end 66. The rotation of the arm 64 also rotates the brake release pin 60, driving the brake release pushrod across the top of the brake assembly 10 to lever the two pairs of brake arms 18a/18b and 18c/18d apart at their upper ends 22a/22b and 22c/22d against the force of the compression springs 42, thereby withdrawing the two brake shoes 26a and 26b and their respective brake linings 30a and 30b from contact with the motor brake drum to allow the motor to turn.

When electrical power to the motor is removed, electrical power to the solenoid 82 is also removed, allowing the plunger 78 to be withdrawn from the coil 84 by the rotation of the brake release pin arm 64 and links 68 as the compression springs 42 force the arm pairs 18a/18b and 18c/18d together to force the brake shoes 26a and 26b together and apply the brake linings 30a/30b to the drum.

The above described brake 10 incorporates various advantages over other known devices, one of which is that the solenoid 82 is offset from the actuation plane of the brake shoes 26a and 26b. This provides a significant advantage in terms of maintenance of the present brake 10, in that it is not necessary to disconnect and remove the solenoid from the brake assembly, as required with various other known brake assemblies. The brake shoes 26a and 26b of the present brake assembly 10 are easily removed for replacement of the linings 30a and 30b thereon, or for other maintenance and/or service, merely by removing the four brake shoe mounting bolts (e.g., bolts 28a in FIG. 1 and 28b in FIG. 2) and withdrawing the two brake shoes 26a and 26b generally radially outwardly from the brake assembly 10. With the present brake 10, it is not necessary to disconnect any part of the brake release or adjustment linkage, thus removing any need to reconnect and readjust those components. Accordingly, the task of removing and replacing brake shoes in the present brake 10 is a matter of only a few minutes.

Another advantage of the present brake device 10 is that once the brake release arm has been adjusted at its first end 48a to provide proper brake actuation when the solenoid plunger 78 is released, and also to provide clearance between the brake linings 30a, 30b and the brake drum when the solenoid 82 is energized, that no further adjustment of the linkage is required during the life of the brake linings 30a and 30b. This is due to the novel linkage of the present brake embodiments, but also due to the stop means provided for the brake release pushrod 48 to preclude excessive travel.

Figure 4A:
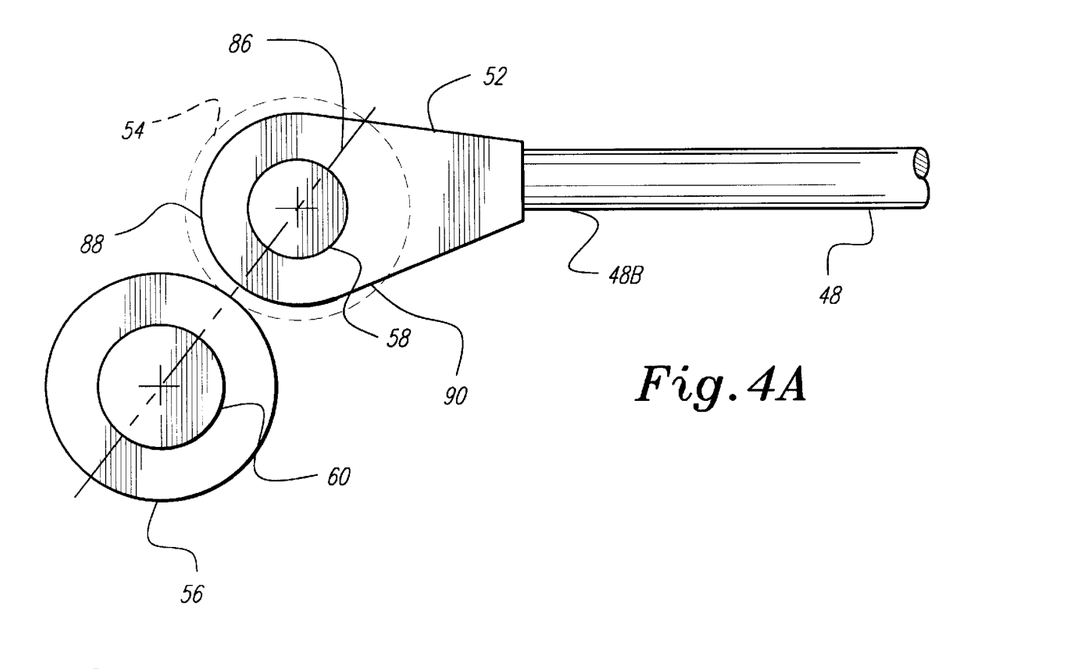
FIG. 4A is a detailed elevation view of the first end of the brake adjustment and release arm of the present motor brake invention, as it would appear with the brakes released.
Figure 4B:
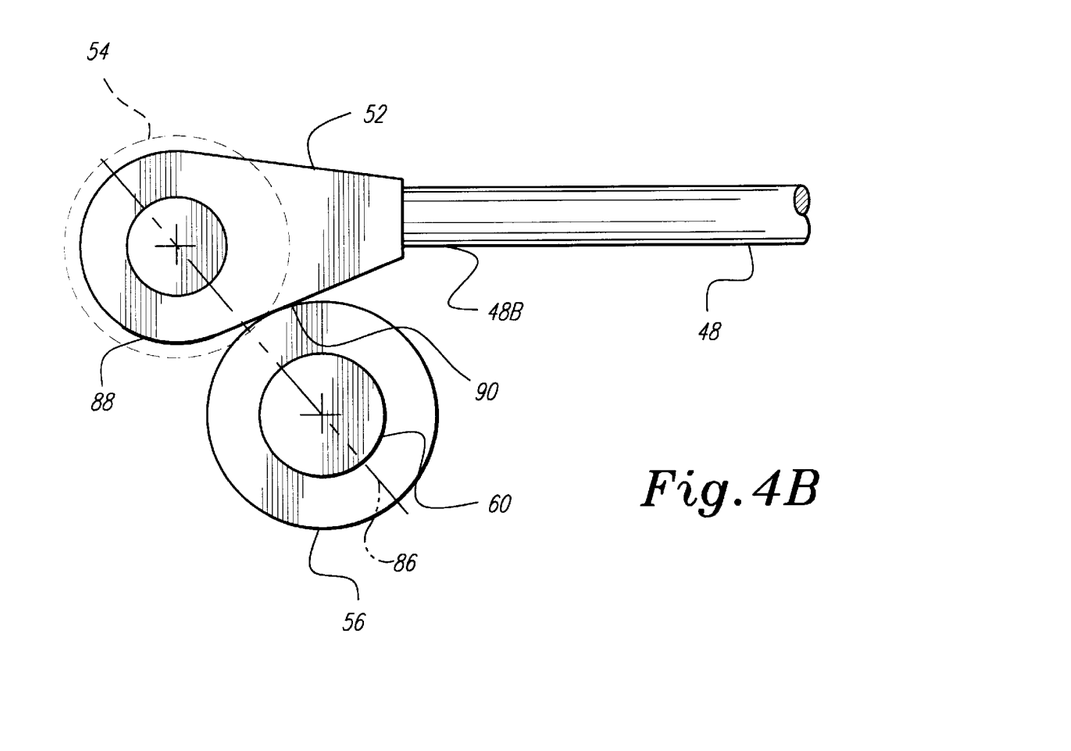
FIG. 4B is a detailed elevation view of the brake adjustment and release arm as it would appear with the brakes actuated, showing the mechanical limit which serves to limit the rise of the plunger or armature of the solenoid.

This stop means is shown in FIGS. 4A and 4B of the drawings. In FIG. 4A, the brake release pushrod 48 is shown in a brake released position, i.e., with the pushrod 48 rotated toward the opposite brake arm pair to spread the two brake arms apart in order to release the brake from the drum. The axis 86 of the center of the radially offset bushings 54 (shown in broken lines) and the center of the collar 56, shows that the rod end bearing 52 has been rotated away from the collar 56, with clearance provided between the collar 56 and the rod end bearing 52 due to the rounded end 88 of the rod end bearing 52.

However, when electrical power to the solenoid is removed, the compression springs will drive the brake shoes together and retract the brake release pushrod 48 to a position relative to the brake release pin 60, somewhat like that shown in FIG. 4B. As the rod end bearing 52 moves leftward relative to the brake release pin 60, the extended surface 90 of the rod end bearing 52 will bear against the surface of the collar 56, thus precluding further leftward movement of the rod end bearing 52 (and the brake release pushrod 48) due to the interference between the collar 56 and extended surface 90 of the rod end bearing 52. This prevents excessive travel of the brake release linkage, thus precluding excessive withdrawal of the solenoid plunger 78 from the solenoid coil 84, thereby prolonging the life of the coil 84 by avoiding coil burnout, which is a common problem when the "air gap," or height of the raised plunger 78 relative to the coil 84, is excessive.

As noted above, the solenoid air gap is critical in terms not only of actuation of the linkage of the present brake, but also due to the critical nature of the air gap when the brake is released, to preclude coil burnout when electrical power is applied to the solenoid. Accordingly, it is very important that the air gap of the solenoid of such electrically released brakes be set precisely in order to provide the required actuation and also to preclude coil burnout. The present invention may include an air gap setting gauge 92, which is removably placed between the head or upper end 76 of the solenoid 82, and the top of the solenoid frame, to adjust the brake release pushrod 48 at its attachment end 48a with the guide block 36a. The gauge 92 is preferably secured to the base 12 or other component of the brake 10 by a chain 94 or other suitable means to preclude loss of the gauge 92, as shown in FIG. 1.

Additional accessories may be provided with the present brake in order to ease various maintenance and service tasks, and a bracket 96 extending upwardly from the base 12 is provided in order to hold and store various accessories thereon. As noted further above, the compression springs 42 used with the present brake 10 provide a great deal of force driving the upper ends of the brake arm pairs 18a/18b and 18c/18d together. This force is overcome when electrical power is provided to the solenoid 82, to draw the solenoid plunger 78 downwardly into the solenoid 82 and release the brake. However, when it is desired to hold the brake in a released position without applying electrical power to the solenoid 82, some other means must be used.

Accordingly, a solenoid plunger retaining pin 98 may be included with the present brake, as shown in FIG. 3. This pin 98 is inserted into a retaining pin tube 100, which is affixed (welded, etc.) to the side of the bracket 96. The pin 98 is captured by the tube 100, with the pin distal end 102 extending past the tube 100 to pass over the top of the solenoid plunger head 76 when the plunger 78 is fully retracted into the solenoid coil 84. Thus, when power is removed from the system, the springs 42 are precluded from applying the brakes due to the plunger retaining pin 98 precluding the rise of the plunger 78 from the solenoid coil 84. As in the case of the air gap gauge 92, the solenoid plunger retaining pin 98 may be connected to the frame 12 or other brake component by a chain 104 or other suitable means, to preclude loss of the pin 98.

When work is to be performed on the present brake, or perhaps on the motor or other components of such a system, it is most important that the system be immobilized to preclude rotation of the motor and thus movement of any components which may be normally driven by the motor. In the case of overhead cranes, the weight of the lift or hoist block which is normally suspended on cables below the lift motor, may be sufficient to cause the motor to turn even though no power is being applied to the motor. This is especially true if a load is suspended from the block. In fact, this is a major application for the present brake invention, i.e., to prevent "block drop" by applying a brake to the motor when the motor is at rest.

Most conventional motor brake drums of motors with which the present brake is used, include a plurality of passages therethrough to allow a pin to be inserted therein to prevent the drum (and motor) from turning when the motor drum brake is released, e.g., for maintenance or service on the motor or brake. The present brake 10 may include such a brake drum locking pin 106, as shown in FIG. 3. The pin 106 is inserted through the brake lock pin retaining tube 108, in the manner of the solenoid pin 98 discussed above. The distal end 110 of the brake lock pin 106 extends into one of the passages in the brake drum, to preclude the drum from turning when the present brake is released for whatever reason. When the motor and drum are to be returned to operation, the brake lock pin 106 is withdrawn from the drum passage. Storage sockets (tubes, etc., not shown) may be provided for the solenoid retaining pin 98 and brake lock pin 106, if so desired, in the manner of the storage receptacle 112 provided for the air gap gauge 92. The brake lock pin 106 is also preferably secured to the brake structure by a chain 114, or other suitable means, to preclude loss thereof.

It may be important in certain applications of the present brake, to maintain a record of brake release and actuation cycles. Accordingly, the present brake may also include a counter mechanism 116 affixed to the upper end of the accessory bracket 96, if so desired. The counter 116 is conventional, and is actuated by a lever arm 118 extending from the side thereof. A brake arm lever 120 extending from the arm 64 communicates with the counter lever arm 118 to actuate the counter 116 whenever the brake is applied.

It will be seen that the above described brake 10 essentially defines a relatively freely moving parallelogram structure, with the base 12 forming one side, the opposite arm pairs 18a/18b and 18c/18d forming the two opposite ends, and the two parallel tension rods 38 forming the side opposite the base. As the junctures of all of these components are pivots, the upper structure can translate laterally relative to the base 12, when not secured about a brake drum to limit such motion. Accordingly, an adjustable stop is provided at at least one side of the brake assembly 10, comprising a stop block 122 secured (welded, etc.) across or between the two brake arm support flanges 14a and 14b of the frame 12, at one end thereof. A pair of adjustable stop bolts or screws 124a and 124b are threaded through mating passages in the stop block 122, with jam nuts 126a and 126b serving to lock the screws 124a and 124b at the desired positions. The ends of the screws 124a and 124b bear against the two respective first pair brake arms 18a and 18b, thus preventing their movement in the direction of the stop block 122. A similar arrangement (not shown) may be provided for the opposite pair of brake arms 18c and 18d, if desired.

The present brake 10 is engineered to provide great durability and long life with relatively low maintenance. Most of the moving components of the brake 10 are formed of stainless steel in order to achieve this goal, with corrosion and binding between components being greatly reduced or eliminated. This is particularly important for the brake shoe attachment pins, e.g. pins 28a and 28b, in order to provide ease of removal of the shoes 26a and 26b.

Most of the various pins, pivots, arms, and other movable and/or pivotable connections of the present brake are lubricated using either sealed bearings, e.g., the rod end bearing 52, or lubrication fittings, e.g., the guide block fittings 128 which secure the two guide blocks 36a and 36b between the respective brake arm pair upper ends 22a/22b and 22c/22d. Other components which may incorporate such sealed bearings or lubrication fittings are the lower ends 20a, 20b, 20c, and 20d of the four brake arms 18a, 18b, 18c, and 18d where they pivotally connect to the support flanges 14a and 14b, the brake shoe mounting passages 24a, 24b, 24c, and 24d which serve to secure the two brake shoes 26a and 16b), the brake release pin 60 and its passage through the upper ends 22c and 22d of the second pair of brake arms 18c and 18d, and the various pins and connections of the linkage between the solenoid plunger 78 and the brake release pin arm 64, i.e., upper and lower pins 72 and 80 and their respective passages through the upper and lower ends 70 and 74 of the two links 68, the distal end 66 of the brake release pin arm 64, and the passage through the upper end 76 of the solenoid plunger 78. While the above lubrication points have been noted specifically, it will be understood that more or fewer lubrication points may be provided as desired, depending upon the intended service of the brake, the materials used, accessibility of the brake while in service, etc.

The above described motor brake 10 has the brake release solenoid 82 positioned in axial alignment with the motor and its brake drum, and centered on a line between the two brake shoes 26a and 26b, as described further above. This displacement of the solenoid 82 from a line passing laterally through the two brake shoes 26a and 26b, provides ease of access to the two brake shoes 26a and 26b, particularly for such a brake shoe which might be positioned immediately adjacent to and behind the solenoid. However, it may be desirable to offset the solenoid from both the plane of the brake shoes, and the axis of the motor and drum. The brake embodiment 10a of FIG. 2 discloses such a configuration.

Figure 2:
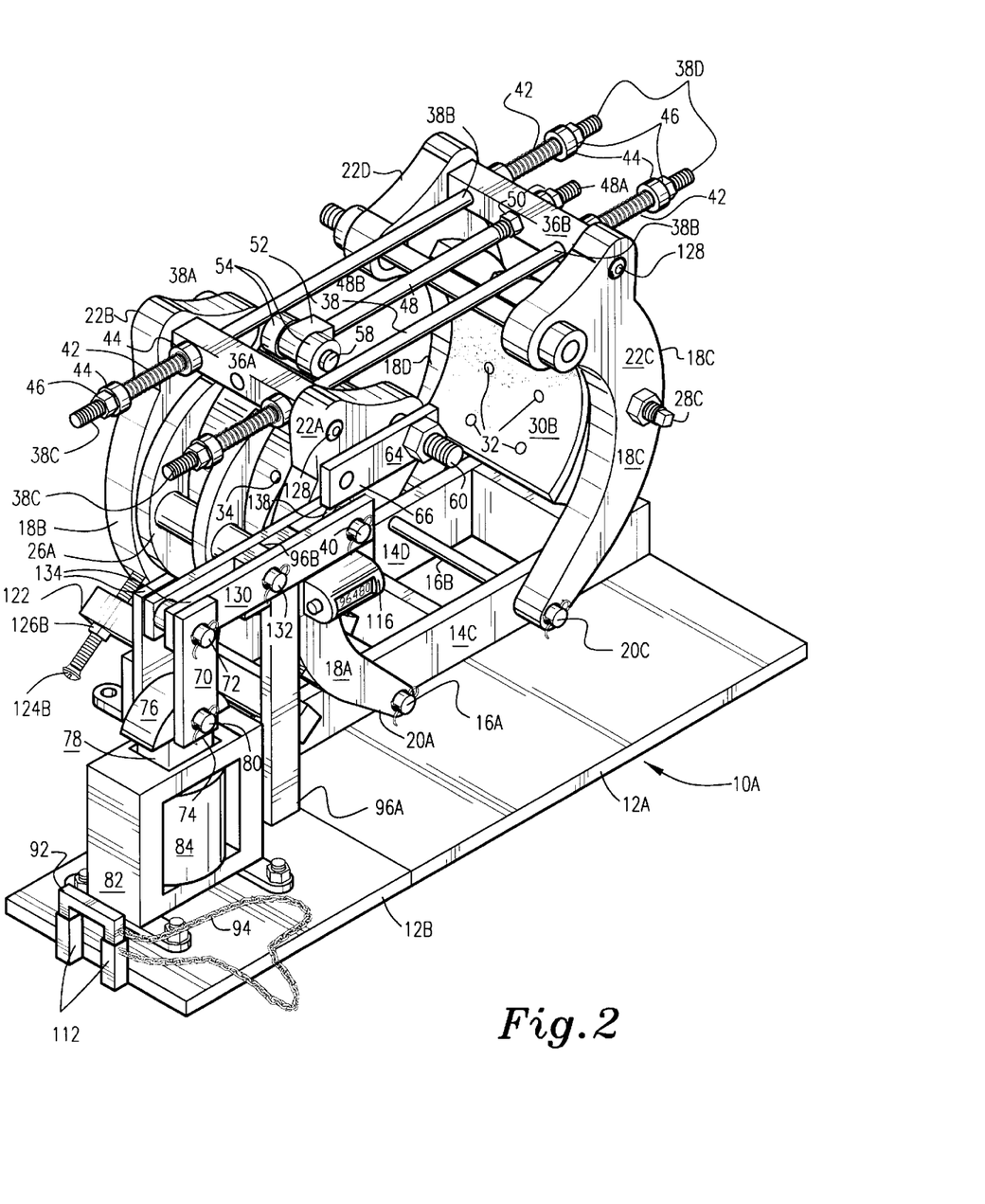
FIG. 2 is a perspective view of a second embodiment of the present motor brake.

The brake 10a of FIG. 2 is constructed generally along the lines of the brake 10 of FIGS. 1 and 3, having a base 12a with brake arm support flanges 14c and 14d, etc. However, it will be seen that the base 12a has an axially offset extension 12b, to which the solenoid 82 is secured. The remaining components of the brake 10, with the exception of the linkage between the solenoid 82 and the brake release pin arm 64, will be seen to be substantially similar in their individual structures and in their assembled relationship to one another, to those components comprising the assembly of the brake 10 of FIGS. 1 and 3. It will be noted, however, that the brake arm release pin 60 and the orientation of the brake release pushrod 48 have been reversed from right to left in the embodiment 10a of FIG. 2, as the solenoid 84 is positioned to the left front of the brake 10a as viewed in FIG. 2. The mechanism may be oriented left/right, or right/left, as desired.

In the brake 10a of FIG. 2, a fixed support 96a, similar to the bracket 96 of FIGS. 1 and 2, extends upwardly from the base 12a and/or its extension 12b. A pair of spaced apart rocker arms 130 each have a generally centrally disposed pivot point, with the rocker arms 130 being pivotally secured to the upper end 96b of the support 96a by a rocker arm attachment pin 132 to sandwich the upper end 96b of the support 96a between the two rocker arms 130.

Each of the rocker arms 130 has a first end 134, with the ends 134 being pivotally secured to the upper ends 70 of a pair of links 68, essentially similar to the links 68 shown in the brake embodiment 10 of FIGS. 1 and 2. The link upper ends 70 include a pin 72 therethrough, to attach the links 70 pivotally to the first ends 134 of the rocker arms 130 and sandwich the first rocker arm ends 134 between the link upper ends 70. The opposite lower ends 74 of the links 68 are pivotally secured to the upper end 76 of the solenoid plunger 78, in the manner of the linkage of the brake embodiment 10 of FIGS. 1 and 3. The second ends 136 of the two rocker arms 130 include a roller or bearing 138 sandwiched therebetween and held in place by a bearing pin 140, with the bearing 138 being coplanar with and serving to contact the distal end 66 of the radial brake release pin arm 64.

The brake 10a of FIG. 2 operates generally similarly to the brake 10 of FIGS. 1 and 3, i.e., in a fail safe manner, with the brake shoes 26a and 26b and their lining 30a and 30b being forced against the motor brake drum by the pressure of the springs 42 when no electrical power is being applied to the solenoid 82.

When power is applied to the solenoid 82 of the motor brake embodiment 10a of FIG. 2, the solenoid plunger 78 is electromagnetically attracted by the coil 84, to draw the plunger 78 downwardly into the coil 84 core. This draws the two links 68 downwardly, which in turn draws the two first ends 134 of the rocker arms 130 downward as well. Due to the fulcrum provided by the rocker arm pivot point at the attachment pin 132, the opposite second ends 136 of the two rocker arms 130 are forced upwardly. This causes the roller bearing 138 disposed between two rocker arm second ends 136 to bear against the underside of the distal end 66 of the brake release pin radial arm 64, thus causing the arm 64 to rotate.

At this point, the operation is identical to that described for the motor brake 10 of FIGS. 1 and 3, with the brake release pin 60 rotating to pivot the offset rod end bearing 52 toward the opposite side of the assembly, thus driving the brake release pushrod 48 to spread the upper end pairs 22a/22b and 22c/22d of the brake arms 18a/18b and 18c/18d apart, thereby moving the brake shoes 26a and 26b and their linings 30a and 30b away from the motor brake drum to release the brake and allow the motor to turn. Removal of electrical power from the solenoid coil 84 reverses the above operation, as the compression springs 42 drive the upper end pairs 22a/22b and 22c/22d of the brake arm pairs 18a/18b and 18c/18d together to actuate the brake when the solenoid plunger 78 is no longer electromagnetically retained within the solenoid coil 84.

In summary, the present fail safe motor brake in its various embodiments will be seen to provide significant advantages over other devices of the related art. The present motor brake simplifies maintenance and repair of the device to a great extent, by removing the solenoid from a position aligned with the plane of the brake shoes. This allows the brake shoes to be removed, serviced, and/or replaced without need to remove the solenoid or to disconnect any of the actuation or release linkage for the brakes. Removal and replacement of brake shoes using the present motor brake is a task requiring no more than a few minutes.

The brake linings are preferably riveted to the shoes, thus making the shoes reusable rather than having to discard the shoes when bonded linings are worn. Operators of the present brake may retain one or more pairs of brake shoes having fresh or serviceable linings therein, so that when the infrequent need to replace the linings occurs, a mechanic may merely exchange the shoes with worn linings for the replacement shoes with serviceable linings, and then rivet new linings into the original shoes as time permits at a later point to retain as a backup brake shoe set.

The numerous sealed bearings or joints equipped with external lubrication fittings also ensures long life and durability for the present brake embodiments, as routine lubrication will go far toward extending the life of the various bearing surfaces. The present brake embodiments also use stainless steel for most, if not all, moving parts, thus eliminating corrosion and another possible source of trouble with the brake.

It has also been found that the linkage described above for the present brake embodiments, allows the brake linings to wear from their new thicknesses down to their minimum thicknesses before replacement, without requiring any adjustment of the linkage to adjust the air gap of the solenoid plunger. The present brake is set up by first tightening the four compression spring pressure adjusting nuts tightly, to provide a preload to the compression springs when the brakes are applied to the drum, for good braking action. The air gap setting tool is then inserted between the plunger head and the top of the solenoid, and the brake release pushrod adjusted to provide the required air gap (on the order of three quarters of an inch) when no electrical power is being applied to the solenoid coil and the brake is applied to the drum.

At this point, the brake is ready for operation, and it has been found that through thousands of cycles, the combination of the thick, woven brake lining material and the linkage of the present invention, results in little change in the air gap of the solenoid, which stays well within tolerance to avoid coil burnout due to excessive plunger travel. The linkage stop means, comprising the interference between the rod end bearing and coupling sleeve, further assures that excessive linkage travel will not occur. Thus, the present brake embodiments will provide a most desirable advance in the state of the art of industrial motor brakes.

It is to be understood that the present invention is not limited to the sole embodiments described above, but encompasses any and all embodiments within the scope of the following claims.

I claim:

1. A motor brake for a motor brake drum, comprising:

a base;

a pair of first brake arms and an opposite pair of second brake arms, with each of said brake arms having a lower end, an opposite upper end, and a generally central brake shoe mounting passage therethrough;

said lower end of each of said brake arms being pivotally secured to said base;

a first brake shoe and an opposite second brake shoe, with each said brake shoe being pivotally secured respectively between said first brake arms and said second brake arms at a respective said brake shoe mounting passage;

a first tension rod and a separate second tension rod, each having a first portion and an opposite second portion pivotally connected at an attachment point respectively between each said upper end of said first brake arms and each said upper end of said second brake arms;

each said tension rod further including a distal end, with a compression spring adjustably installed between each said distal end and said attachment point of each said tension rod;

a brake release pushrod disposed between each said tension rod and centered above each said brake shoe, with said brake release pushrod defining a vertical brake shoe actuation plane;

a brake release pin pivotally mounted through each said upper end of said second brake arms, with said brake release pushrod being offset from and pivotally secured to said brake release pin;

a solenoid having a vertically movable plunger therein, with said solenoid being affixed to said base at a point clear of said brake shoe actuation plane and each said brake shoe; and said plunger of said solenoid communicating with said brake release pin through a linkage, for releasing each said brake shoe from the motor brake drum by rotating said brake release pin to move said brake release pushrod to urge said brake shoes apart against said springs of said, tension rods when said solenoid is electrically actuated to retract said plunger therein.

2. The motor brake according to claim 1 wherein said solenoid is axially aligned with the motor brake drum, with said linkage comprising:

a radial arm extending from said brake release pin;

a pair of spaced apart links each having a lower end and an opposite upper end, with each said lower end of said links being pivotally secured, to said plunger of said solenoid to sandwich said plunger therebetween; and each said upper end of said links being pivotally secured to said radial arm of said brake release pin to sandwich said radial arm therebetween.

3. The motor brake according to claim 1 wherein said solenoid is axially offset from the motor brake drum, with said linkage comprising:

a radial arm extending from said brake release pin;

a pair of spaced apart rocker arms each having a first end, an opposite second end, and a pivot point therebetween;

a fixed support having an upper end sandwiched between each said pivot point of said rocker arms, with said rocker arms being pivotally attached to said upper end of said support;

a pair of spaced apart links each having a lower end and an opposite upper end, with each said lower end of said links being pivotally secured to said plunger of said solenoid to sandwich said plunger therebetween, and each said upper end of said links being pivotally secured to each said first end of said rocker arms to sandwich said rocker arms therebetween; and each said second end of said rocker arms including a bearing therebetween, with said bearing contacting said radial arm of said brake release pin for driving said radial arm to rotate said brake release pin for spreading said brake arms and releasing said brake shoes from the brake drum when said solenoid is electrically actuated.

4. The motor brake according to claim 1 including mechanical stop means for preventing excessive travel of said linkage, comprising:

a collar immovably affixed to said brake release pin;

said collar including a pair of radially offset bushings immovably affixed thereto and extending therefrom; and said brake release pushrod having a rod end bearing pivotally attached between said offset bushings so that said rod end bearing bears against and interferes with said collar to limit mechanical motion of said linkage when said brake shoes are urged together by said compression springs.

5. The motor brake according to claim 1, including a brake actuation counter operated by said linkage.

6. The motor brake according to claim 1, including a brake locking pin connected thereto for locking the position of the motor brake drum when said brake is released from the motor brake drum.

7. The motor brake according to claim 1, including an air gap gauge connected thereto for checking the setting of said plunger within said solenoid.

8. The motor brake according to claim 1, wherein said brake release pushrod includes a rod end bearing for connecting to said brake release pin, and at least said rod end bearing of said brake release pushrod, each said lower end of said brake arms, said upper end of said brake arms, said brake shoe mounting passage of said brake arms, said brake release pin, and said linkage each includes lubricated joints selected from the group consisting of sealed bearings and joints having external lubrication fittings.

9. The motor brake according to claim 1, wherein said brake shoes and said brake linings include a plurality of concentric ventilation passages therethrough for relieving heat generated by said brake linings when frictionally applied against the motor drum.

10. The motor brake according to claim 1, wherein said brake linings are secured to said brake shoes by rivets.

11. A motor and a motor brake therefor, comprising in combination:

an industrial motor including a motor brake drum;

a motor brake base;

a pair of first brake arms and an opposite pair of second brake arms, with each of said brake arms having a lower end, an opposite upper end, and a generally central brake shoe mounting passage therethrough;

said lower end of each of said brake arms being pivotally secured to said base;

a first brake shoe and an opposite second brake shoe, with each said brake shoe being pivotally secured respectively between said first brake arms and said second brake arms at a respective said brake shoe mounting passage;

a first tension rod and a separate second tension rod, each having a first portion and an opposite second portion pivotally connected at an attachment point respectively between each said upper end of said first brake arms and each said upper end of said second brake arms;

each said tension rod further including a distal end, with a compression spring adjustably installed between each said distal end and said attachment point of each said tension rod;

a brake release pushrod disposed between each said tension rod and centered above each said brake shoe, with said brake release pushrod defining a vertical brake shoe actuation plane;

a brake release pin pivotally mounted through each said upper end of said second brake arms, with said brake release pushrod being offset from and pivotally secured to said brake release pin;

a solenoid having a vertically movable plunger therein, with said solenoid being affixed to said base at a point clear of said brake shoe actuation plane and each said brake shoe; and said plunger of said solenoid communicating with said brake release pin through a linkage, for releasing each said brake shoe from said motor brake drum by rotating said brake release pin to move said brake release pushrod to urge said brake shoes apart against said springs of said tension rods when said solenoid is electrically actuated to retract said plunger therein.

12. The motor and motor brake combination according to claim 11 wherein said solenoid is axially aligned with said motor brake drum, with said linkage comprising:

a radial arm extending from said brake release pin;

a pair of spaced apart links each having a lower end and an opposite upper end, with each said lower end of said links being pivotally secured to said plunger of said solenoid to sandwich said plunger therebetween; and each said upper end of said links being pivotally secured to said radial arm of said brake release pin to sandwich said radial arm therebetween.

13. The motor and motor brake combination according to claim 11 wherein said solenoid is axially offset from said motor brake drum, with said linkage comprising:

a radial arm extending from said brake release pin;

a pair of spaced apart rocker arms each having a first end, an opposite second end, and a pivot point therebetween;

a fixed support having an upper end sandwiched between each said pivot point of said rocker arms, with said rocker arms being pivotally attached to said upper end of said support;

a pair of spaced apart links each having a lower end and an opposite upper end, with each said lower end of said links being pivotally secured to said plunger of said solenoid to sandwich said plunger therebetween, and each said upper end of said links being pivotally secured to each said first end of said rocker arms to sandwich said rocker arms therebetween; and each said second end of said rocker arms including a bearing therebetween, with said bearing contacting said radial arm of said brake release pin for driving said radial arm to rotate said brake release pin for spreading said brake arms and releasing said brake shoes from said motor brake drum when said solenoid is electrically actuated.

14. The motor and motor brake combination according to claim 11 including mechanical stop means for preventing excessive travel of said linkage, comprising:

a collar immovably affixed to said brake release pin;

said collar including a pair of radially offset bushings immovably affixed thereto and extending therefrom; and said brake release pushrod having a rod end bearing pivotally attached between said offset bushings so that said rod end bearing bears against and interferes with said collar to limit mechanical motion of said linkage when said brake shoes are urged together by said compression springs.

15. The motor and motor brake combination according to claim 11, including a brake actuation counter operated by said linkage.

16. The motor and motor brake combination according to claim 11, including a brake locking pin connected thereto for locking the position of said motor brake drum when said brake is released from said motor brake drum.

17. The motor and motor brake combination according to claim 11, including an air gap gauge connected to said motor brake for checking the setting of said plunger within said solenoid.

18. The motor and motor brake combination according to claim 11, wherein said brake release pushrod includes a rod end bearing for connecting to said brake release pin, and at least said rod end bearing of said brake release pushrod, each said lower end of said brake arms, said upper end of said brake arms, said brake shoe mounting passage of said brake arms, said brake release pin, and said linkage each includes lubricated joints selected from the group consisting of sealed bearings and joints having external lubrication fittings.

19. The motor and motor brake combination according to claim 11, wherein said brake shoes and said brake linings include a plurality of concentric ventilation passages therethrough for relieving heat generated by said brake linings when frictionally applied against said motor brake drum.

20. The motor and motor brake combination according to claim 11, wherein said brake linings are secured to said brake shoes by rivets.

* * * * *